United States Patent
Ko et al.

(10) Patent No.: US 12,278,380 B2
(45) Date of Patent: Apr. 15, 2025

(54) BATTERY CURRENT COLLECTOR COMPRISING METAL PLATE HAVING THROUGH HOLES AND POROUS REINFORCING MATERIAL THAT FILLS THROUGH HOLES, AND SECONDARY BATTERY COMPRISING SAME

(71) Applicant: LG ENERGY SOLUTION, LTD., Seoul (KR)

(72) Inventors: Yo Han Ko, Daejeon (KR); Jung Noh Lee, Daejeon (KR); Jong Pil Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 740 days.

(21) Appl. No.: 17/434,939

(22) PCT Filed: Aug. 11, 2020

(86) PCT No.: PCT/KR2020/010591
§ 371 (c)(1),
(2) Date: Aug. 30, 2021

(87) PCT Pub. No.: WO2021/075687
PCT Pub. Date: Apr. 22, 2021

(65) Prior Publication Data
US 2022/0173405 A1     Jun. 2, 2022

(30) Foreign Application Priority Data
Oct. 15, 2019    (KR) ........................ 10-2019-0127753

(51) Int. Cl.
*H01M 4/00*      (2006.01)
*H01M 4/36*      (2006.01)
(Continued)

(52) U.S. Cl.
CPC ........... *H01M 4/762* (2013.01); *H01M 4/364* (2013.01); *H01M 4/661* (2013.01)

(58) Field of Classification Search
CPC ............. H01M 4/76; H01M 4/36; H01M 4/66
See application file for complete search history.

(56) References Cited

U.S. PATENT DOCUMENTS

| | | | |
|---|---|---|---|
| 2009/0246626 A1 | 10/2009 | Tasaki et al. | |
| 2012/0088140 A1* | 4/2012 | Kardasz | H01M 10/613 |
| | | | 429/163 |

(Continued)

FOREIGN PATENT DOCUMENTS

| | | |
|---|---|---|
| CN | 1354529 A | 6/2002 |
| CN | 101341624 A | 1/2009 |

(Continued)

OTHER PUBLICATIONS

Kim et al., The Flexible Electrode, The Flexible Manufacturing Method of Electrode and Secondary Battery Comprising Said Flexible Electrode, Jun. 2019, See the Abstract. (Year: 2019).*

(Continued)

*Primary Examiner* — Anca Eoff
*Assistant Examiner* — Monique M Wills
(74) *Attorney, Agent, or Firm* — MORGAN, LEWIS & BOCKIUS LLP

(57) ABSTRACT

The present invention relates to: a current collector comprising a metal plate having a plurality of through holes formed in the thickness direction, and a porous reinforcing material filling the through holes of the metal plate; and a secondary battery comprising the current collector, and provides the effects of increasing ion conductivity of the current collector in the thickness direction and preventing stress from being concentrated at a specific part.

14 Claims, 4 Drawing Sheets

(51) Int. Cl.
  *H01M 4/66*  (2006.01)
  *H01M 4/76*  (2006.01)

(56)  References Cited

U.S. PATENT DOCUMENTS

| | | |
|---|---|---|
| 2012/0135306 A1 | 5/2012 | Temmyo |
| 2012/0263993 A1 | 10/2012 | Hosoe et al. |
| 2012/0276421 A1 | 11/2012 | Aihara et al. |
| 2015/0349346 A1 | 12/2015 | Yushin et al. |
| 2016/0372780 A1 | 12/2016 | Sohn et al. |

FOREIGN PATENT DOCUMENTS

| | | | | |
|---|---|---|---|---|
| CN | 102473901 A | | 5/2012 | |
| CN | 102610830 A | | 7/2012 | |
| CN | 102683740 A | | 9/2012 | |
| CN | 104205445 A | | 12/2014 | |
| CN | 106257723 A | | 12/2016 | |
| CN | 107634179 A | | 1/2018 | |
| CN | 108550859 A | | 9/2018 | |
| CN | 108933278 A | | 12/2018 | |
| CN | 108987795 A | | 12/2018 | |
| CN | 109937498 A | * | 6/2019 | .......... H01M 10/052 |
| CN | 109994740 A | | 7/2019 | |
| JP | H11-16589 A | | 1/1999 | |
| JP | 2010-0525542 A | | 7/2010 | |
| JP | 4920803 B2 | | 4/2012 | |
| JP | 4924788 B2 | | 4/2012 | |
| JP | 4981220 B2 | | 7/2012 | |
| JP | 5081214 B2 | | 11/2012 | |
| JP | 2013-206705 A | | 10/2013 | |
| JP | 5368589 B2 | | 12/2013 | |
| JP | 2015-023001 A | | 2/2015 | |
| JP | 5687087 B2 | | 3/2015 | |
| JP | 2015-536036 A | | 12/2015 | |
| JP | 2018532228 A | * | 11/2018 | ............ H01M 10/36 |
| KR | 10-2010-0033831 A | | 3/2010 | |
| KR | 10-2015-0050451 A | | 5/2015 | |
| KR | 10-2016-0019172 A | | 2/2016 | |
| KR | 10-1610998 B1 | | 4/2016 | |
| KR | 2016-0089656 A | | 7/2016 | |
| KR | 10-1850180 B1 | | 4/2018 | |
| KR | 2018-0087985 A | | 8/2018 | |
| KR | 10-2018-0103398 A | | 9/2018 | |
| KR | 10-1901776 B1 | | 9/2018 | |
| KR | 10-1990614 B1 | | 6/2019 | |
| WO | 2007-072713 A | | 6/2007 | |

OTHER PUBLICATIONS

ザム, アルナ et al, Alkali Metal or Alkaline Ion Batteries With High Volume and Weight Energy Density, Nov. 2018, See the Abstract. (Year: 2018).*
Office Action dated Aug. 29, 2022 issued in corresponding Japanese Patent Application No. 2021-552661.
International Search Report (with partial translation) and Written Opinion dated Dec. 2, 2020 issued in corresponding International Patent Application No. PCT/KR2020/010591.
Extended European Search Report issued in corresponding European Patent Application No. 20877779.7 dated May 9, 2022.
Office Action dated Nov. 14, 2024 issued in corresponding Korean Patent Application No. 10-2019-0127753.

* cited by examiner

[FIG. 1]
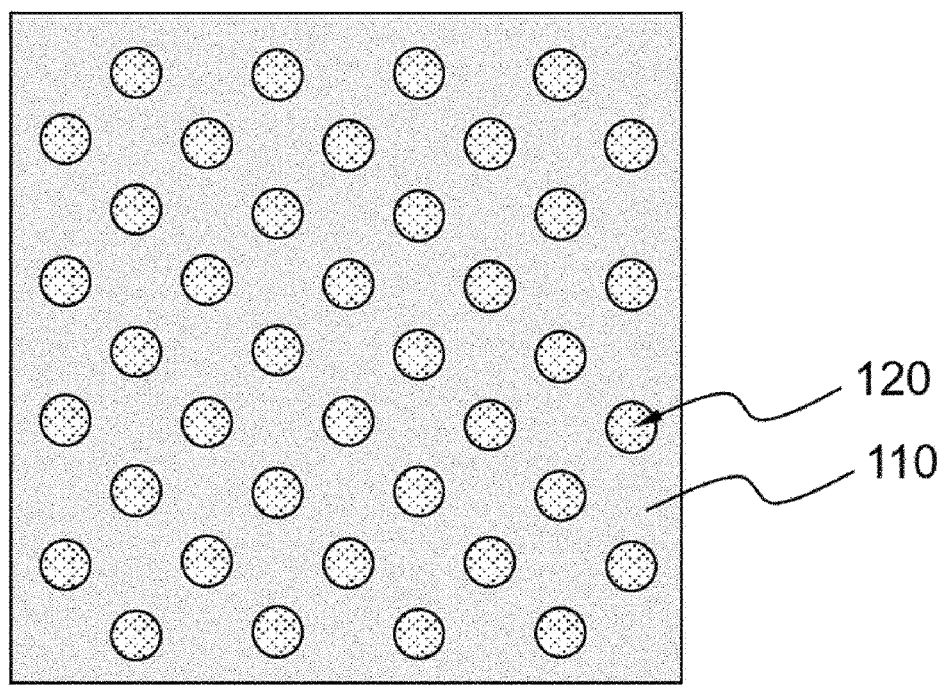

[FIG. 2]
200
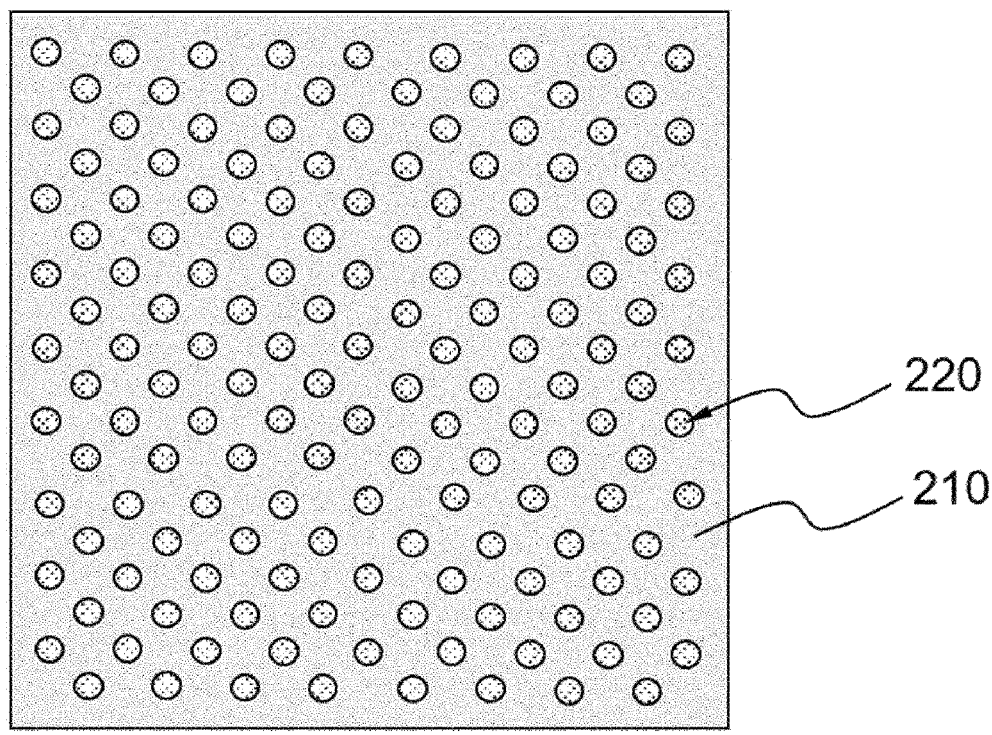

[FIG. 3]
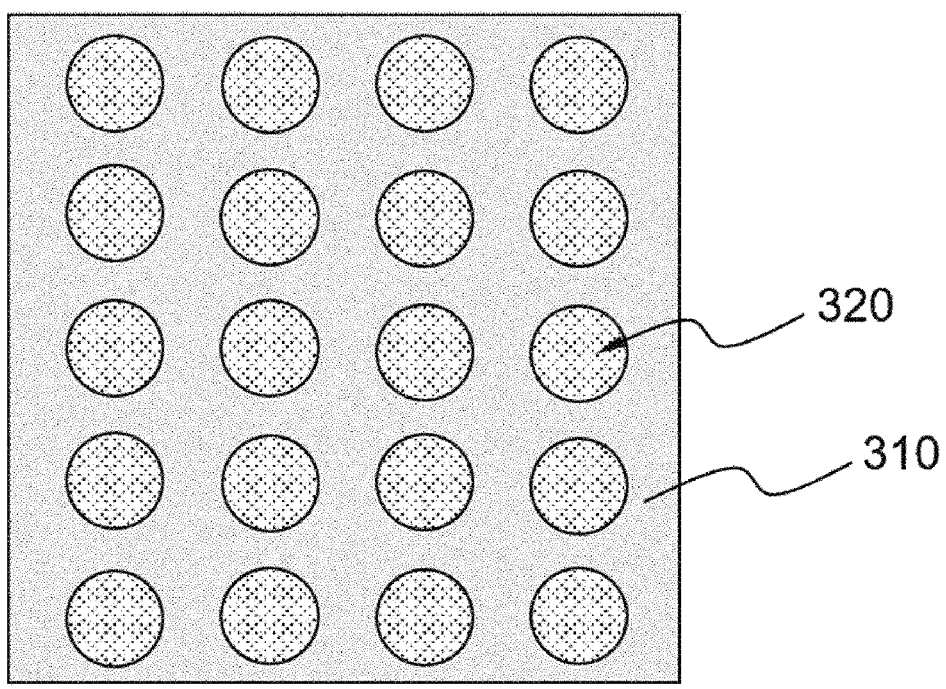

[FIG. 4]
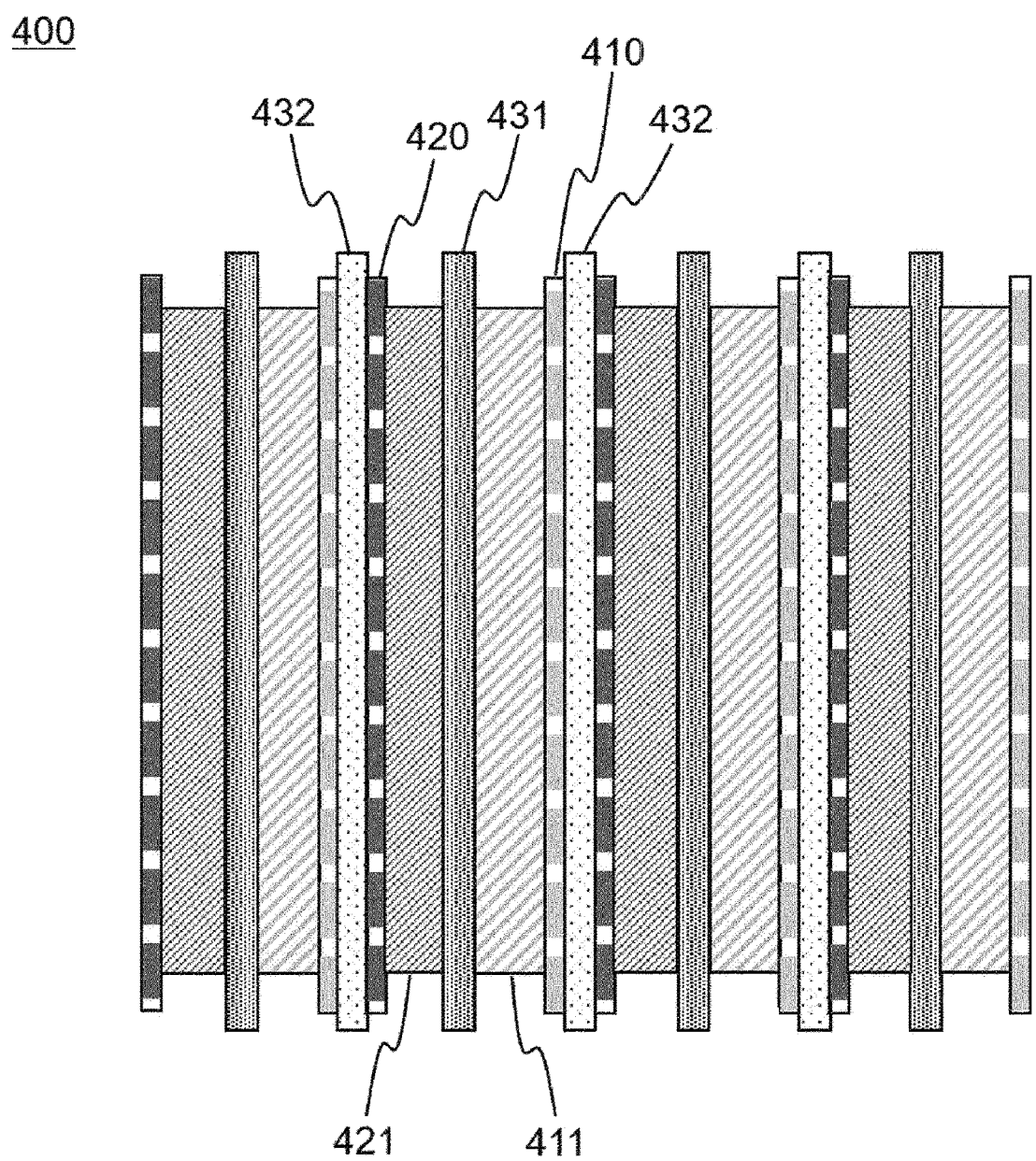

BATTERY CURRENT COLLECTOR COMPRISING METAL PLATE HAVING THROUGH HOLES AND POROUS REINFORCING MATERIAL THAT FILLS THROUGH HOLES, AND SECONDARY BATTERY COMPRISING SAME

TECHNICAL FIELD

The present invention relates to a current collector for a battery including a metal plate having a through hole and a porous reinforcing material filling the through hole, and a secondary battery including the same.

This application claims the benefit of priority based on Korean Patent Application No. 10-2019-0127753, filed on Oct. 15, 2019, and the entire contents of the Korean patent application are incorporated herein by reference.

BACKGROUND ART

As the price of energy sources increases due to the depletion of fossil fuels, and interest in environmental pollution is amplified, the demand for eco-friendly alternative energy sources is increasing. In particular, as technology development and demand for mobile devices increase, the demand for secondary batteries as energy sources is rapidly increasing.

As the demand for secondary batteries is diversified and increased, various types of secondary batteries are being developed. Among them, there is an attempt to increase the ionic conductivity of lithium ions in the thickness direction of the current collector by using a current collector in which a plurality of through holes are formed. However, the current collector in which the through hole is formed has a limitation in that the mechanical strength is lowered due to the formation of the through hole, and the shape change according to the stress concentration is induced. In addition, there is a problem in that the gas component generated in the deterioration process due to battery operation is collected in the through hole and exists in the form of bubbles, thereby inhibiting ion transfer.

Therefore, there is a need for a new type of current collector that solves this problem or a secondary battery technology including the same.

DISCLOSURE

Technical Problem

The present invention is invented to solve the above problems, and an object of the present invention is to provide a current collector for a battery including a metal plate having a through hole and a porous reinforcing material filling the through hole, and a secondary battery including the same.

Technical Solution

In one example, current collector for a battery according to the present invention includes: a metal plate in which a plurality of through holes in a thickness direction are formed; and a porous reinforcing material filled in the through holes of the metal plate.

In a specific example, the reinforcing material includes at least one selected from the group consisting of polymer materials, fibers, inorganic particles, and carbon materials.

In another specific example, the area fraction in which the through hole is formed is in the range of 10 to 90%.

In one example, in the current collector for a battery according to the present invention, the porous reinforcing material has a porosity of 10 to 90% and an air permeability of 100 to 4000 s/100 mL.

In one example, the porous reinforcing material has an ion conductivity of $1\times10^{-10}$ S/cm or more at 20° C.

In one example, the porous reinforcing material includes at least one of polyethylene (PE), polypropylene (PP), polymethyl methacrylate (PMMA), polyvinylidene fluoride (PVdF), carboxymethyl cellulose (CMC), epoxy resin and urethane resin.

In one example, the porous reinforcing material has a structure in which fibers having a diameter of 5 to 50 μm and an L/D of 20 or more are dispersed.

In a specific example, the porous reinforcing material further includes a lithium salt, and the lithium salt contains Li+ as cations, and contains one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, SCN and $(CF_3CF_2SO_2)_2N^-$ as anions.

In further another specific example, the porous reinforcing material contains one type of first inorganic particles selected from the group consisting of $BaTiO_3$, $Pb(Zr, Ti)O_3$ (PZT), $Pb_{1-a}La_aZr_{1-b}Ti_bO_3$ (PLZT, herein, $0<a<1$, $0<b<1$), $Pb(Mg_{1/3}Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC.

In further another specific example, the porous reinforcing material further contains at least one type of second inorganic particles selected from the group consisting of lithium phosphate ($Li_3PO_4$), lithium titanium phosphate ($Li_cTi_d(PO_4)_3$, $0<c<2$, $0<d<3$), lithium aluminum titanium phosphate ($Li_aAl_bTi_c(PO_4)_3$, $0<<2$, $0<b<1$, $0<c<3$), (LiAl-TiP)$_aO_b$ ($0<a<4$, $0<b<13$), lithium lanthanum titanate ($Li_aL-a_bTiO_3$, $0<a<2$, $0<b<3$), lithium germanium thiophosphate ($Li_aGe_bP_cS_d$, $0<a<4$, $0<b<1$, $0<c<1$, $0<d<5$), lithium nitride ($Li_aN_b$, $0<a<4$, $0<b<2$), $Li_aSi_bS_c$ ($0<a<3$, $0<b<2$, $0<c<4$) and $Li_aP_bS_c$ ($0<a<3$, $0<b<3$, $0<c<7$).

In one example, the porous reinforcing material includes a porous polymer substrate and a porous coating layer formed on one or both surfaces of the porous substrate.

In addition, the present invention provides a secondary battery including a current collector for a battery described above.

In one example, a secondary battery according to the present invention includes an electrode assembly having a structure that unit cells including a positive electrode, a first separator, and a negative electrode are repeated, and the second separator is interposed between the unit cells, wherein at least one of the positive electrode and the negative electrode includes: a metal plate in which a plurality of through holes in a thickness direction are formed; and a porous reinforcing material filled in the through holes of the metal plate.

In a specific example, the positive electrode and the negative electrode respectively have a structure in which an electrode mixture layer is laminated on one surface of a current collector in a direction facing the first separator.

In another specific example, the positive electrode and the negative electrode each have a structure in which an electrode mixture layer is laminated on one surface of a current collector in a direction facing the first separator, and the current collector may include a metal plate having a through hole in a thickness direction; and a porous reinforcing material filled in the through hole of the metal plate.

Advantageous Effects

According to a current collector for a battery and a secondary battery including the same according to the present invention, the ionic conductivity in the thickness direction of the current collector is increased by using a metal plate having a plurality of through holes in the thickness direction, and the concentration of stress is prevented by filling the through hole with a porous reinforcing material.

According to a current collector for a battery and a secondary battery including the same according to the present invention, ion transfer within the electrode occurs in both directions of the separator and the direction of the current collector, and thus the electrolyte resistance element is reduced, and at the same time, the through hole is filled with a reinforcing material to prevent gas elements generated during battery operation from being located in the through hole, thereby maintaining the initial battery performance for a long time.

BRIEF DESCRIPTION OF THE DRAWINGS

FIGS. 1 to 3 are schematic diagrams each showing a current collector according to an embodiment of the present invention.

FIG. 4 is a schematic diagram showing a stacked structure of a secondary battery according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a current collector for a battery, including: a metal plate in which a plurality of thickness direction through-holes are formed; and a porous reinforcing material filled in the through hole of the metal plate.

In the example below, the reinforcing material includes at least one selected from the group consisting of polymer materials, fibers, inorganic particles, and carbon materials. For example, the reinforcing material may have a structure filled with a porous polymer, a structure in which fibers, inorganic particles, or carbon materials are dispersed in a polymer matrix, or a structure in which fibers, inorganic particles, or carbon materials are dispersed together with a binder.

In the present invention, the metal plate has a plurality of through holes in the thickness direction, and the through holes formed in the metal plate are filled with polymer components. In particular, the through hole is filled with a porous reinforcing material. Through this, the current collector for a battery according to the present invention can reduce, for example, von Mises stress by reducing the deformation rate of the current collector corresponding to the applied tension and solving the concentration of stress. In addition, by filling the through hole formed in the metal plate with a porous reinforcing material, there is an effect of smoothing the movement of lithium ions in a direction penetrating the current collector.

In one embodiment, the through hole has a structure in which 10 to 500 holes are formed per unit area of 10 cm×10 cm. Specifically, the number of through holes per unit area may be 10 to 300, 10 to 200, 10 to 100, 10 to 70, 30 to 50, 50 to 500, 100 to 200, 50 to 300, 100 to 500, 30 to 200, or 10 to 200.

In another embodiment, the area fraction in which the through hole is formed is in the range of 10 to 90%. Specifically, the area fraction in which the through hole is formed is in the range of 10 to 90%, 10 to 70%, 10 to 50%, 20 to 90%, 30 to 90%, or 30 to 60%. By controlling the number or area fraction per unit area of through holes in the above range, it is possible to reduce the deformation rate of the current collector and prevent the concentration of stress without a significant decrease in mechanical strength.

In one embodiment, the porous reinforcing material has a porosity of 10 to 90% and air permeability of 100 to 4000 s/100 mL. The porous reinforcing material according to the present invention has a high porosity and excellent air permeability, and thus high ion conductivity can be realized.

In one embodiment, the porous reinforcing material has an ion conductivity of 1×10-10 S/cm or more at 20° C. The ion conductivity of the porous reinforcing material is in the range of, for example, $1\times10^{-10}$ to $1\times10^{-7}$ S/cm, $1\times10^{-8}$ to $1\times10^{-5}$ S/cm, $1\times10^{-6}$ to $1\times10^{-3}$ S/cm, $1\times10^{-4}$ to $1\times10^{-2}$ S/cm or $1\times10^{-4}$ to $1\times10^{-1}$ S/cm. In one example, the ion conductivity of the porous reinforcing material may be calculated through Equation 1 below.

$$\sigma = t/(Rb^*A) \qquad \text{[Equation 1]}$$

In Equation 1, σ is the ion conductivity (S/cm) of the porous reinforcing material. In addition, t denotes the thickness of the porous reinforcing material, Rb denotes the bulk resistance of the porous reinforcing material obtained from the impedance spectrum, and A denotes the area of the porous reinforcing material.

In one embodiment, the porous reinforcing material includes at least one of polyethylene (PE), polypropylene (PP), polymethyl methacrylate (PMMA), polyvinylidene fluoride (PVdF), carboxymethyl cellulose (CMC), epoxy resin and urethane resin. Additionally, when the current collector for a battery of the present invention is applied to an all-solid-state battery, a solid electrolyte may be present in the through hole, and at this time, the porous reinforcing material may be mixed with the solid electrolyte and filled in the through hole.

In another embodiment, the porous reinforcing material has a structure in which fibers having a diameter of 5 to 50 μm and an L/D of 20 or more are dispersed. The structure in which the fibers are dispersed may be a structure in which fibers and a binder are dispersed together or fibers are dispersed in a polymer matrix.

In yet another embodiment, the porous reinforcing material may be inorganic particles or carbon materials of various shapes or compositions. The carbon material may be graphene, carbon nanotubes or graphite. For example, the carbon nanotubes are single-walled carbon nanotubes.

In yet another embodiment, the porous reinforcing material includes a lithium salt. Specifically, the lithium salt contains Li+ as a cation. Further, the lithium salt includes one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, SCN and $(CF_3CF_2SO_2)_2N^-$ as anions. The lithium salt acts as a source of lithium ions in the battery to enable operation of the lithium battery. In the present invention, the lithium salt is eluted from the porous reinforcing material and introduced into the electrolyte solution, thereby increasing the ionic conductivity of the electrolyte solution. The lithium salt eluted with the electrolyte can play a role of replenishing electrolytes consumed in the continuous charging and discharging process when the lithium salt slowly elutes over a long period of time or the remaining lithium salt slowly elutes after a large number of lithium salts are initially eluted.

In yet another embodiment, the porous reinforcing material includes inorganic particles. Specifically, when inorganic particles having a high dielectric constant are used, the ion conductivity of the electrolyte solution may be improved by contributing to an increase in the degree of dissociation of an electrolyte salt, such as a lithium salt, in a liquid electrolyte. The kind of these inorganic particles is not particularly limited, and inorganic particles selected from the group consisting of inorganic particles having a dielectric constant of about 5 or more and/or inorganic particles having a lithium ion transfer capability (in the case of a lithium secondary battery) and mixtures thereof may be used.

Inorganic particles with the dielectric constant of 5 or more may include one or more selected from the group consisting of $BaTiO_3$, $Pb(Zr, Ti)O_3$ (PZT), $Pb_{1-a}La_aZr_{1-b}Ti_bO_3$ (PLZT, herein, 0<a<1, 0<b<1), $Pb(Mg_{1/3}Nb_{2/3})O_3$—$PbTiO_3$ (PMN—PT), Hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC. In the present invention, inorganic particles having a dielectric constant of 5 or more are also referred to as first inorganic particles.

Inorganic particles having the lithium ion transfer ability may include at least one or more selected from the group consisting of lithium phosphate ($Li_3PO_4$), lithium titanium phosphate ($Li_cTi_d(PO_4)_3$, 0<c<2, 0<d<3), lithium aluminum titanium phosphate ($Li_aAl_bTi_c(PO_4)_3$, 0<a<2, 0<b<1, 0<c<3), $(LiAlTiP)_aO_b$ (0<a<4, 0<b<13), lithium lanthanum titanate ($Li_aLa_bTiO_3$, 0<a<2, 0<b<3), lithium germanium thiophosphate ($Li_aGe_bP_cS_d$, 0<a<4, 0<b<1, 0<c<1, 0<d<5), lithium nitride ($Li_aN_b$, 0<a<4, 0<b<2), $Li_aSi_bS_c$ (0<a<3, 0<b<2, 0<c<4) and $Li_aP_bS_c$ (0<a<3, 0<b<3, 0<c<7). In the present invention, inorganic particles having a lithium ion transfer ability are also referred to as second inorganic particles.

In the present invention, any one of the first and second inorganic particles may be used alone or as a mixture. When the first and second inorganic particles are mixed and used, the content ratio of the first and second inorganic particles is 20 to 60:40 to 80 ratio or 40 to 60:40 to 60 based on the weight ratio.

The inorganic particles are dispersed in a polymer matrix forming a porous reinforcing material. For example, the polymer film may include a porous structure due to an interstitial volume between inorganic particles.

In a specific embodiment of the present invention, the size of the inorganic particles is in the range of 10 nm to 20 μm, 100 nm to 3.5 μm, or 300 nm to 900 nm. It is preferable that the sizes of the inorganic particles be uniform with little variation. However, as the sizes of the particles are non-uniform, the thickness of the polymer film may become uneven. In addition, the smaller the particle size, the greater the surface area of the particles, so the content of the binder resin to be used may increase and the dispersibility may decrease. On the other hand, as the particle size increases, the film thickness may become too thick.

In the present invention, the lithium salt and the inorganic particles may have a structure contained in the porous reinforcing material or dispersed on the surface of the porous reinforcing material. Alternatively, the porous reinforcing material may have a structure including a polymer substrate and a porous coating layer coated on one or both sides of the polymer substrate. In this case, the lithium salt and the inorganic particles are dispersed in the polymer substrate, and can be applied as a component forming the porous coating layer at the same time.

When both the lithium salt and the inorganic particles are included, the content ratio of the lithium salt and the inorganic particles is 10 to 40:60 to 90 ratio or 20 to 40:80 to 60 ratio based on the weight ratio. When the content of the lithium salt is too small, the amount of eluted lithium ions is small, and the amount of pores generated by the elution of the lithium salt is insufficient, making it difficult to achieve a desired level of ion conductivity. On the other hand, if the amount of lithium salt exceeds the above range and is added in a large amount, heat resistance may be deteriorated due to the small amount of inorganic particles or binder resin added, mechanical properties may be deteriorated as too many pores are formed due to the elution of the lithium salt, and lithium metal may precipitate at the interface as the adhesive force between the current collector and the electrode mixture layer decreases. In addition, in the case that the content of the inorganic particles is too small, the interstitial volume between particles is reduced and a binder resin is added to form a predetermined thickness, thereby decreasing porosity of the porous coating layer, and in the case that inorganic particles are added in excess of the above range, the filling density may increase during the slurry coating and drying process, thereby decreasing air permeability.

In another embodiment, when forming a coating layer including the lithium salt and/or inorganic particles, the coating layer may further include a binder component. For example, the coating layer includes inorganic particles, a lithium salt, and a binder resin, and the inorganic particles are connected and fixed to each other by a binder resin to form a porous structure.

In one embodiment, the porous reinforcing material includes a porous polymer substrate and a porous coating layer formed on one or both surfaces of the porous substrate. The polymer substrate may have a polymer substrate in which pores are formed during polymerization or a structure in which pores are formed through stretching. In addition, the porous coating layer may have a structure in which inorganic particles are coated on the surface of a polymer substrate. The inorganic particle coating layer serves to increase the conductivity of ions without inhibiting the porosity of the polymer substrate.

For example, the porous polymer substrate is formed of a polyolefin resin, the porous coating layer includes inorganic particles, a lithium salt, and a binder resin, and the inorganic particles are connected and fixed to each other by a binder resin to form a porous structure. Specifically, the porous polymer substrate is a thin film in the form of a sheet and can be applied if it has excellent ion permeability and mechanical strength. The material of such a polymer base may include a polyolefin-based film such as polypropylene having excellent chemical resistance, and a sheet or nonwoven fabric made of glass fiber or polyolefin, etc. As commercially available products, for example, Celgard TM2400, 2300 (manufactured by Hoechest Celanse corp), polypropylene membrane (manufactured by Ube Industrial Ltd. or Pall RAI) or polyethylene (Tonen or Entek) group products may be used, but is not limited thereto. In addition, the porous coating layer serves to supplement the mechanical strength of the porous reinforcing material and impart heat resistance.

The inorganic particles are connected and fixed to each other by a binder resin described below to form a porous structure. The porous coating layer has a porous structure by an interstitial volume between the inorganic particles, and the interstitial volume is a space defined by inorganic particles substantially surface-contacted in a closed packed structure or densely packed structure.

The binder resin is not particularly limited as long as it exhibits a bonding force with the electrode mixture layer laminated on the current collector and a bonding force between inorganic components and lithium salts in the mixed coating layer and is not easily dissolved by an electrolyte solution. For example, the binder resin may be one or a mixture of two or more selected from the group consisting of polyvinylidene fluoride (PVdF), polyvinylidene fluoride-cohexafluoropropylene, polyvinylidene fluoride-trichloroethylene, polyvinylidene fluoride-chlorotrifluoroethylene (PVdF-CTFE), polymethyl methacrylate, polyacrylonitrile, polyvinylpyrrolidone, polyvinylacetate, ethylene-vinyl acetate copolymer (polyethylene-co-vinyl acetate), polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, and may specifically be PVdF or PVdF-CTFE.

The content of the binder resin may be in the range of 0.1 to 20% by weight or 1 to 10% by weight of 100% by weight of the porous coating layer in consideration of the bonding strength between inorganic particles and/or lithium salts, and the bonding strength between the current collector and the electrode mixture.

In addition, the present invention provides a secondary battery including a current collector for a battery described above.

In one embodiment, the secondary battery according to the present invention includes an electrode assembly having a structure that unit cells including the positive electrode, the first separator, and the negative electrode are repeated, and the second separator is interposed between the unit cells. Any one or more of the positive electrode and the negative electrode may include a metal plate having a through hole in a thickness direction; and an ion conductive porous reinforcing material filled in the through hole of the metal plate.

In one embodiment, the porous reinforcing material has an ionic conductivity of $1 \times 10^4$ or more according to Equation 1 under the condition of 20° C.

In another embodiment, the positive electrode and the negative electrode respectively have a structure in which an electrode mixture layer is laminated on one surface of a current collector in a direction facing the first separator.

In a specific embodiment, the positive electrode and the negative electrode each have a structure in which an electrode mixture layer is laminated on one surface of a current collector in a direction facing the first separator, and the current collector may include a metal plate having a through hole in a thickness direction; and an ion conductive porous reinforcing material filled in the through hole of the metal plate.

The secondary battery in the present invention is, for example, a lithium secondary battery. The lithium secondary battery may include, for example, an electrode assembly described above; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof. Specifically, the current collector for the positive electrode is formed of metal components described above, and includes a metal plate having a through hole in the thickness direction, and an ion conductive porous reinforcing material filled in the through hole of the metal plate.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials. Specifically, the current collector for the negative electrode is formed of metal components described above, and includes a metal plate having a through hole in the thickness direction, and an ion conductive porous reinforcing material filled in the through hole of the metal plate.

In addition, the negative electrode may include a conductive material and a binder commonly used in the art.

The first and second separators may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

Hereinafter, the present invention will be described in more detail through examples and drawings.

Example 1: Manufacture of Current Collector

A number of through-thickness holes were formed in the aluminum foil. If a solution obtained by mixing polyethylene resin, methyl ethyl ketone (MEK) solvent and polyvinylidene fluoride (PVdF) binder in an amount of 100:30:5 parts by weight is coated on the surface using a first doctor blade, the solution fills the through hole and the residue forms a coating layer on the foil surface. At this time, a second doctor blade was used to wipe off the remaining coating layer on the surface of the foil. When the residual coating layer was not sufficiently removed depending on the viscosity and volatility according to the type and composition of the coating solution, the residual coating layer was removed through third polishing.

The manufactured current collector is shown in FIG. 1. Referring to FIG. 1, the current collector has a structure in which a plurality of through-type holes are formed in a metal plate 110 made of an aluminum foil having a width of 10 cm and a length of 10 cm. The through-type hole of the metal plate 110 is filled with a porous reinforcing material 120. The porous reinforcing material 120 is formed of polyethylene resin.

Example 2: Manufacture of Current Collector

A current collector was manufactured in the same manner as in Example 1, except that polypropylene resin was used instead of polyethylene resin.

The manufactured current collector is shown in FIG. 2. Referring to FIG. 2, the current collector has a structure in which a plurality of through-type holes are formed in a metal plate 210 made of an aluminum foil having a width of 10 cm and a length of 10 cm. The through-type hole of the metal plate 210 is filled with a porous reinforcing material 220. The porous reinforcing material 220 is formed of polypropylene resin.

Example 3: Manufacture of Current Collector

A number of through-thickness holes were formed in the aluminum foil. A solution of 100:30 parts by weight of a polypropylene short fiber and a methyl ethyl ketone (MEK) solvent was filled in the through-type hole of the aluminum foil. Then, it was roll pressed and dried. The short fibers have a diameter of 20 μm and an L/D of about 50.

Example 4: Manufacture of Current Collector

A current collector was manufactured in the same manner as in Example 1, except that copper foil was used instead of aluminum foil.

The manufactured current collector is shown in FIG. 3. Referring to FIG. 3, the current collector has a structure in which a plurality of through-type holes are formed in a metal plate 310 made of a copper foil having a width of 10 cm and a length of 10 cm. The through-type hole of the metal plate 310 is filled with a porous reinforcing material 320. The porous reinforcing material 320 is formed of polyethylene resin.

Comparative Example 1: Manufacture of Current Collector

A number of through-thickness holes were formed in the aluminum foil.

Example 5: Manufacture of Secondary Battery 100 parts by weight of NCM ($LiNi_{0.8}Co_{0.1}Mn_{0.1}O_2$) as a positive electrode active material, 1.5 parts by weight of carbon black (FX35, Denka) as a conductive material, and 2.3 parts by weight of polyvinylidene fluoride (KF9700, Kureha) as a binder polymer were added to NMP (N-methyl-2-pyrrolidone) as a solvent to thereby prepare a positive electrode mixture layer slurry. The positive electrode mixture layer slurry was coated on one side of the current collector according to Example 1 in a loading amount of 640 mg/25 cm² and then vacuum-dried to thereby obtain a positive electrode.

100 parts by weight of artificial graphite (GT, Zichen (China)) as a negative electrode active material, 1.1 parts by weight of carbon black (Super-P) as a conductive material, 2.2 parts by weight of styrene-butadiene rubber, and 0.7 parts by weight of carboxy methyl cellulose to water were added to water as a solvent to prepare a negative electrode active material, and was then coated, dried and pressed on one side of the current collector according to Example 4, to thereby manufacture a negative electrode.

On the other hand, polypropylene was uniaxially stretched using a dry method to prepare a separator having a microporous structure having a melting point of 165° C. and a width of 200 mm on one side. An electrode assembly is prepared, and the electrode assembly has a structure in which a first separator is interposed between a positive electrode and a negative electrode, and a second separator is positioned at the external side of the positive electrode and the negative electrode. Then the electrode assembly was built into a battery case, and a 1M LiPF6 carbonate-based electrolyte solution was injected to thereby complete a battery.

The cross-sectional structure of the electrode assembly included in the manufactured secondary battery is shown in FIG. 4. Referring to FIG. 4, the electrode assembly 400 according to the present invention has a structure that unit cells including positive electrodes 410 and 411, a first separator 431 and negative electrodes 420 and 421 are repeated, and a second separator 432 is interposed between the unit cells.

Experimental Example 1 Ion Conductivity Measurement

The ion conductivity of the porous reinforcing material filled in the hole of the current collector according to Example 1 was measured. Ion conductivity was measured by using the AC impedance measurement method according to the temperature after a gold (Au) electrode was coated on the top of the porous reinforcing material filled in the hole of the current collector prepared in Example 1 in a circle having a diameter of 1 mm using a sputter method. The ion conductivity was measured in a frequency band of 100 MHz to 0.1 Hz using a VMP3 measuring device and 4294A.

As a result of the measurement, it was confirmed that the ionic conductivity of the porous reinforcing material filled in the hole of the current collector according to Example 1 was about 1.0×10-3 S/cm.

Experimental Example 2 Evaluation of Current Collector Properties

Tensions of various sizes were applied to the current collector prepared in Comparative Example 1, and the resulting length deformation and von Mises stress were evaluated. The results are shown in Table 1 below.

In the case of aluminum, a Young's modulus of 70 Gpa was used. Polypropylene (PP), one of the reinforcing materials that can be filled in the hole, has a Young's modulus of 1.5 to 2 Gpa. In addition, a reinforced polymer such as a glass-reinforced polyester matrix (17.2 GPa) may be used. In this experimental example, a reinforcing polymer whose Young's modulus was adjusted to 5.0 Gpa was used as a reinforcing material.

TABLE 1

| F_tensile (MPa) | Porosity | Displacement field, X component(m) | Total displacement(m) | Von Mises Stress(GPa) |
|---|---|---|---|---|
| 500 | 0.3217 | 7.68E−06 | 7.78E−06 | 0.78199 |
| 1,000 | 0.3217 | 1.54E−05 | 1.56E−05 | 1.564 |
| 1,500 | 0.3217 | 2.30E−05 | 2.33E−05 | 2.346 |

Tensions of various sizes were applied to the current collector prepared in Example 1, and the resulting length deformation and von Mises stress were evaluated. The results are shown in Table 2 below.

TABLE 2

| F_tensile (MPa) | Porosity | Displacement field, X component(m) | Total displacement(m) | Von Mises Stress(GPa) |
|---|---|---|---|---|
| 500 | 0.3217 | 6.70E−06 | 6.81E−06 | 0.51205 |
| 1,000 | 0.3217 | 1.34E−05 | 1.36E−05 | 1.0241 |
| 1,500 | 0.3217 | 2.01E−05 | 2.04E−05 | 1.5362 |

The results of evaluation of physical properties of the current collectors prepared in Comparative Example 1 and Example 1 were compared. Specifically, the difference between the value of the physical property of the sample of Example 1 and the value of the physical property of the sample of Comparative Example 1 was converted into a percentage value. The results are shown in Table 3 below.

TABLE 3

| x-displacement change(%) | Total displacement change(%) | von Mises Stress change(%) |
|---|---|---|
| 6.70E−06 | 6.81E−06 | 0.51205 |
| 1.34E−05 | 1.36E−05 | 1.0241 |
| 2.01E−05 | 2.04E−05 | 1.5362 |

Referring to Table 3, when comparing the deformed lengths when tension is applied, and the deformed length of the sample of Example 1 was reduced by about 10%, compared to that of the sample of Comparative Example 1. Further, when comparing von Mises stresses, the von Mises Stress of the sample of Example 1 was reduced by about 35%, compared to that of the sample of Comparative Example 1. In the above, the present invention has been described in more detail through the drawings and examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 100, 200, 300: current collector
110, 210, 310: metal plate
120, 220, 320: porous reinforcing material
400: electrode assembly
410: positive electrode current collector
411: positive electrode mixture layer
420: negative electrode current collector
421: negative electrode mixture layer
431: first separator
432: second separator

The invention claimed is:

1. A current collector for a battery, comprising:
 a metal plate having a plurality of through holes in a thickness direction; and
 a porous reinforcing material filled in at least one of the plurality of through holes,
 wherein
 an electrode active material is disposed on the current collector,
 the electrode active material incudes a compound that is not included in the porous reinforcing material, and
 the porous reinforcing material includes a porous polymer substrate and a porous coating layer disposed on one or both surfaces of the porous substrate.

2. The current collector of claim 1, wherein the porous reinforcing material comprises at least one selected from the group consisting of polymer materials, fibers, inorganic particles, and carbon materials.

3. The current collector of claim 1, wherein an area ratio of the through holes on a surface of the metal plate is in a range of 10 to 90%.

4. The current collector of claim 1, wherein the porous reinforcing material has a porosity of 10 to 90% and an air permeability of 100 to 4000 s/100 mL.

5. The current collector of claim 1, wherein the porous reinforcing material has an ion conductivity of $1 \times 10^{-10}$ S/cm or more at 20° C.

6. The current collector of claim 1, wherein the porous reinforcing material includes at least one of polyethylene (PE), polypropylene (PP), polymethyl methacrylate (PMMA), polyvinylidene fluoride (PVdF), carboxymethyl cellulose (CMC), epoxy resin or urethane resin.

7. The current collector of claim 1, wherein the porous reinforcing material includes fibers having a diameter of 5 to 50 μm and an L/D of 20 or more dispersed therein.

8. The current collector of claim 1, wherein the porous reinforcing material further comprises a lithium salt, and
wherein the lithium salt contains $Li^+$ as cations, and contains one or more anions selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$ $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$.

9. The current collector of claim 1, wherein the porous reinforcing material contains at least one type of first inorganic particles selected from the group consisting of $BaTiO_3$, $Pb(Zr,Ti)O_3$ (PZT), $Pb_{1-a}La_aZr_{1-b}Ti_bO_3$ (PLZT, here, $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC.

10. The current collector of claim 1, wherein the porous reinforcing material further contains at least one type of second inorganic particles selected from the group consisting of lithium phosphate ($Li_3PO_4$), lithium titanium phosphate ($Li_cTi_d(PO_4)_3$, $0<c<2$, $0<d<3$), lithium aluminum titanium phosphate ($Li_aAl_bTi_c(PO_4)_3$, $0<a<2$, $0<b<1$, $0<c<3$), $(LiAlTiP)_aO_b$ ($0<a<4$, $0<b<13$), lithium lanthanum titanate ($Li_aLa_bTiO_3$, $0<a<2$, $0<b<3$), lithium germanium thiophosphate ($Li_aGe_bP_cS_d$, $0<a<4$, $0<b<1$, $0<c<1$, $0<d<5$), lithium nitride ($Li_aN_b$, $0<a<4$, $0<b<2$), $Li_aSi_bS_c$ ($0<a<3$, $0<b<2$, $0<c<4$) and $Li_aP_bS_c$ ($0<a<3$, $0<b<3$, $0<c<7$).

11. A secondary battery comprising an electrode assembly having a plurality of unit cells wherein each of the unit cell includes a positive electrode, a first separator, and a negative electrode in an order listed, and a second separator is interposed between the unit cells,
wherein at least one of the positive electrode or the negative electrode comprises:
a metal plate having a plurality of through holes in a thickness direction,
a porous reinforcing material filled in at least one of the plurality of through holes, and
an electrode active material disposed on the current collector,
wherein the electrode active material incudes a compound that is not included in the porous reinforcing material, and
the porous reinforcing material includes a porous polymer substrate and a porous coating layer disposed on one or both surfaces of the porous substrate.

12. The secondary battery of claim 11, wherein the positive electrode and the negative electrode each have a current collector and an electrode mixture layer disposed between the current collector and the first separator.

13. The secondary battery of claim 11, wherein the positive electrode and the negative electrode each have a current collector and an electrode mixture layer disposed between the current collector and the first separator, and
wherein the current collector includes: the metal plate having a plurality of through holes in the thickness direction; and the porous reinforcing material filled in at least one of the through holes.

14. A current collector for a battery, comprising:
a metal plate having a plurality of through holes in a thickness direction; and
a porous reinforcing material filled in at least one of the plurality of through holes,
wherein the porous reinforcing material includes a porous polymer substrate and a porous coating layer disposed on one or both surfaces of the porous substrate.

* * * * *